(12) United States Patent
Haga

(10) Patent No.: US 7,703,445 B2
(45) Date of Patent: Apr. 27, 2010

(54) FUEL SUPPLY SYSTEM

(75) Inventor: Fumihiro Haga, Zushi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 492 days.

(21) Appl. No.: 11/658,396

(22) PCT Filed: Jul. 21, 2005

(86) PCT No.: PCT/JP2005/013373

§ 371 (c)(1),
(2), (4) Date: Jan. 26, 2007

(87) PCT Pub. No.: WO2006/011409

PCT Pub. Date: Feb. 2, 2006

(65) Prior Publication Data

US 2008/0141984 A1    Jun. 19, 2008

(30) Foreign Application Priority Data

Jul. 28, 2004  (JP) ............................. 2004-219466
Feb. 21, 2005  (JP) ............................. 2005-044289

(51) Int. Cl.
*F02M 21/00* (2006.01)
*F02B 43/08* (2006.01)
*F02D 41/04* (2006.01)

(52) U.S. Cl. .......................... 123/525; 123/676; 123/3; 123/DIG. 12; 123/1 A; 422/186.04; 422/186.21; 422/198; 422/186.22; 60/606; 423/650; 204/168

(58) Field of Classification Search .......... 123/DIG. 12, 123/3, 1 A, 525; 422/186.21, 186.22, 186.04; 422/198; 423/650; 204/168; 60/606
See application file for complete search history.

(56) References Cited

U.S. PATENT DOCUMENTS

| | | | | | |
|---|---|---|---|---|---|
| 4,033,133 | A | * | 7/1977 | Houseman et al. | 60/606 |
| 4,420,462 | A | * | 12/1983 | Clyde | 422/201 |
| 4,774,152 | A | * | 9/1988 | Matsumura et al. | 429/12 |
| 5,425,332 | A | * | 6/1995 | Rabinovich et al. | 123/3 |
| 5,887,554 | A | * | 3/1999 | Cohn et al. | 123/3 |
| 6,606,855 | B1 | * | 8/2003 | Kong et al. | 60/275 |

(Continued)

FOREIGN PATENT DOCUMENTS

JP        7-292372  A        11/1995

(Continued)

OTHER PUBLICATIONS

Y. Sekine et al., "Development of Novel Hydrogen Production System for Liquid Fuel Reforming Under Ambient Temperature," Proceedings of 13$^{th}$ Conference of the Japan Institute of Energy, Jul. 29-30, 2004, pp. 227-229.

*Primary Examiner*—Michael Cuff
*Assistant Examiner*—Hung Q Nguyen
(74) *Attorney, Agent, or Firm*—Foley & Lardner LLP

(57) ABSTRACT

A fuel supply system of the present invention is characterized by including: a fuel reformer (4) for producing a reformed gas-containing fuel by causing discharge in a raw liquid fuel; and a fuel supply device (8) for supplying the reformed gas-containing fuel or a mixture of the reformed gas-containing fuel and the raw fuel into a combustion chamber of an engine (5).

20 Claims, 12 Drawing Sheets

U.S. PATENT DOCUMENTS

| | | | |
|---|---|---|---|
| 6,827,047 B2 * | 12/2004 | Qian et al. | 123/3 |
| 7,241,429 B2 * | 7/2007 | Greathouse et al. | 422/186.21 |
| 7,290,522 B2 * | 11/2007 | Heywood et al. | 123/300 |
| 2002/0194835 A1 * | 12/2002 | Bromberg et al. | 60/275 |
| 2003/0047147 A1 * | 3/2003 | Daniel et al. | 123/3 |
| 2004/0099226 A1 * | 5/2004 | Bromberg et al. | 123/3 |
| 2004/0118046 A1 * | 6/2004 | Williamson et al. | 48/197 R |

FOREIGN PATENT DOCUMENTS

| | | |
|---|---|---|
| JP | 9-263778 | 10/1997 |
| JP | 2001-050119 A | 2/2001 |
| JP | 2001-167784 A | 6/2001 |
| JP | 2002-038981 A | 2/2002 |
| JP | 2002-295264 A | 10/2002 |
| JP | 2003-514166 A | 4/2003 |
| JP | 2003-212502 A | 7/2003 |
| JP | 2003-529717 A | 10/2003 |
| WO | WO 01/33056 A1 | 5/2001 |
| WO | WO 01/75294 A1 | 10/2001 |
| WO | WO 03-076790 A1 | 9/2003 |

* cited by examiner

FUEL SUPPLY SYSTEM

TECHNICAL FIELD

The present invention relates to a fuel supply system. More specifically, the present invention relates to a fuel supply system including a fuel reformer for producing hydrogen-containing gas by an electric discharge in a fuel liquid, and a fuel supply device for supplying such a reformed fuel to an engine.

BACKGROUND ART

In recent years, various researches and developments have been conducted regarding production of hydrogen-containing gas by fuel reforming in order to utilize the hydrogen-containing gas for various industrial purposes such as a fuel of a fuel cell and hydrogenation of a variety of organic compounds.

As a fuel for producing the hydrogen-containing gas, hydrocarbons such as methane and gasoline and alcohols such as methanol are used in general. In a fuel reforming reaction, there are steam reforming, partial oxidation reforming, and autothermal reforming in which the steam reforming and the partial oxidation reforming are combined. Reaction formulas in the case of performing the partial oxidation reforming and the steam reforming for methane are shown below.

Partial oxidation reaction: $CH_4 + 1/2O_2 \rightarrow 2H_2 + CO$ 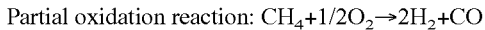

Steam reforming reaction: $CH_4 + H_2O \rightarrow 3H_2 + CO$ 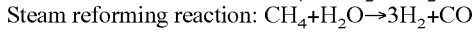

Heretofore, in order to produce the hydrogen-containing gas by using the above-described fuel, a method for producing the hydrogen-containing gas has been generally used, in which the fuel and water are first mixed together in a predetermined ratio, and thereafter, the resultant mixture is vaporized, and the resultant gas is supplied to a reformer including a reforming catalyst. However, in the conventional method by means of the reforming catalyst, which is as described above, it is necessary to advance the above-described reaction at a temperature as high as 700 to 900° C. Therefore, a concentration of carbon monoxide in the hydrogen-containing gas thus obtained has sometimes risen due to equilibrium. As a result, there has been a problem that a shift reactor for removing the carbon monoxide, which is installed at a subsequent stage of the reformer, is enlarged. Moreover, it is necessary to heat up the reforming catalyst to a predetermined temperature, and there has been a problem that startability and responsiveness of an apparatus for use in this method are inferior. Moreover, since the reforming catalyst which is expensive is used, there has also been a problem that cost of the production is increased.

In order to solve the problems as described above in the conventional method, there is proposed a method for producing the hydrogen-containing gas in a vapor phase by using plasma generated by an electric discharge (refer to Japanese Patent Laid-Open Publication No. H07-292372 and Japanese Patent Laid-Open Publication No. 2001-167784). However, it is necessary to vaporize the fuel in order to reform the fuel in the vapor phase by using the discharge plasma. Hence, a vaporizer for vaporizing the fuel in a liquid state must be installed, and in addition, heat energy for vaporizing the fuel is also necessary. Therefore, there has been a problem that the apparatus is enlarged in the case of being applied to a fuel cell vehicle and the like. Moreover, such problems as extension of a starting time and a response time and an increase of starting energy, which are caused by the vaporization of the fuel, have also occurred. Furthermore, there has occurred such a problem that, at a time of cold start or an output variation from a low output to a high output, a necessary quantity of heat for the vaporization cannot be collected to be recovered, thereby a plasma treatment cannot be performed.

In order to solve such problems as described above, the inventors of the present invention have disclosed, as means capable of achieving the reforming in a liquid phase without vaporizing the liquid fuel, a fuel reformer capable of generating the hydrogen-containing gas by the discharge plasma, in which an insulating film including a pinhole is provided between a pair of electrodes (refer to Proceedings of 13th Conference of The Japan Institute of Energy, p. 228).

DISCLOSURE OF INVENTION

However, such a fuel reformer has a problem as below because the insulating film is provided therein. Specifically, bubbles of the gas generated by the reforming are sometimes attached onto a portion of the pinhole which the insulating film includes, and there is an apprehension that a stable electric discharge cannot be maintained for a sufficient time. Moreover, following the installation of the insulating film, a shape of a reaction container and a supply mode of the liquid fuel are restricted, and there is an apprehension that the output of the electric discharge cannot be sufficiently increased. Furthermore, the installation itself of the insulating film will make the production cost higher.

The present invention has been made in consideration for the above-described problems. It is an object of the present invention to provide a fuel supply system including a fuel reformer capable of exerting excellent reforming performance in the liquid phase without installing the insulating film between the electrodes, and including a fuel supply device for efficiently supplying the produced hydrogen-containing gas and the like to an engine.

A fuel supply system according to an aspect of the present invention is characterized by including: a fuel reformer for producing a reformed gas-containing fuel by discharging electricity in a raw liquid fuel; and a fuel supply device for supplying the reformed gas-containing fuel or a mixture of the reformed gas-containing fuel and the raw fuel into a combustion chamber of an engine.

BEST MODE FOR CARRYING OUT THE INVENTION

Figure 1:
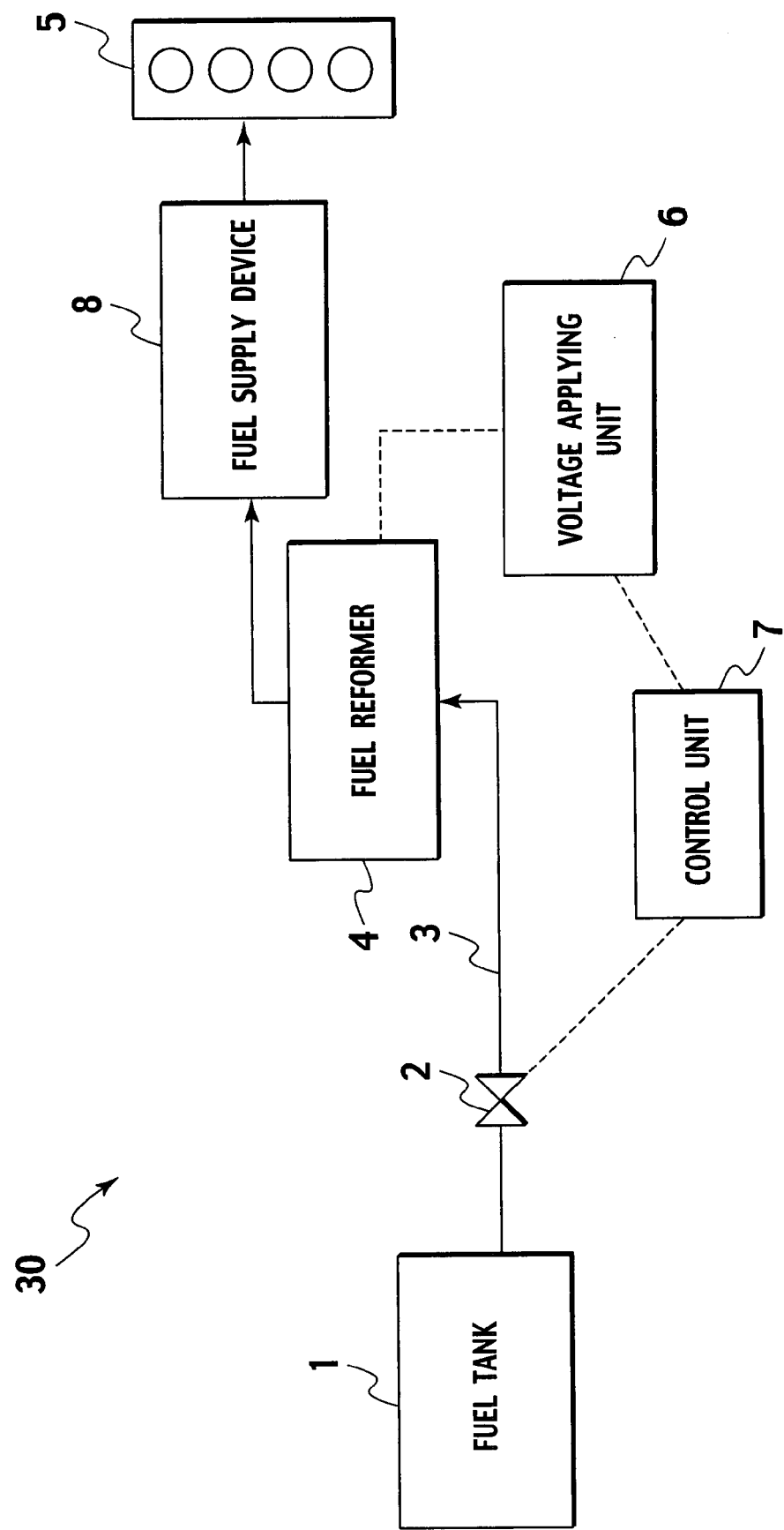
FIG. 1 is a schematic view showing a fuel supply system of Embodiment 1 in the present invention.

A description is made below of embodiments of the present invention by using the drawings. Note that, in the drawings to be explained below, the same reference numerals are assigned to the same in function, and a repeated description thereof is omitted. Moreover, for convenience of the description, dimensional ratios of the drawings are exaggerated, and illustrated modes are sometimes different from the actual ones.

A fuel supply system of the present invention is a system for supplying a reformed fuel or a mixture of the reformed fuel and a raw fuel to a combustion chamber of an engine. The fuel supply system is a system including: a fuel reformer for reforming the raw fuel; and a fuel supply device for supplying the reformed fuel and/or the raw fuel to the combustion chamber of the engine.

In FIG. 1, a construction of a fuel supply system in Embodiment 1 is shown. The fuel supply system 30 in this embodiment includes: a first fuel supply passage 3 including a first valve 2; a fuel reformer 4 provided midway of the first fuel supply passage 3; and a fuel supply device 8 for supplying the reformed fuel and the raw fuel to a combustion chamber of an engine 5. Moreover, this fuel supply system 30 includes an electric discharge controller composed of a voltage applying unit 6 for applying a voltage to electrodes provided in the fuel reformer 4, and of a control unit 7 for controlling the voltage applying unit 6 and the first valve 2.

As the fuel reformer 4, a device composed of the pair of electrodes which are arranged opposite to each other in a liquid fuel and discharge electricity can be used. The fuel reformer 4 of the present invention is a device for causing a plasma reforming reaction and producing hydrogen-containing gas by executing discharge in the raw liquid fuel supplied from a fuel tank 1 without vaporizing the raw fuel. The fuel reformer 4 will be described later in detail.

The fuel supply device 8 is a device for supplying reformed gas (reformed fuel) reformed by the fuel reformer 4 and/or an unreformed raw fuel to the combustion chamber of the engine 5. As the fuel supply device 8, there can be used a device for increasing a pressure in a tank and pressure-feeding the fuel, a fuel injection valve, a fuel pump, and the like. The control unit 7 controls an opening of the first valve 2, an output voltage of the voltage applying unit 6, and the like based on data of a starting situation of the engine, a vehicle speed, and the like. The voltage applying unit 6 applies a predetermined voltage to the pair of electrodes provided in the fuel reformer 4 based on a signal from the control unit 7. A high-voltage power supply, a direct-current power supply, an alternating-current power supply, a high-frequency power supply, and the like can be used as the voltage applying unit 6. Any tank can be used as the fuel tank 1 as long as the tank can store the raw fuel. The first valve 2 opens and closes based on a signal from the control unit 7 to adjust a fuel supply quantity to the fuel reformer 4.

The first fuel supply passage 3 allows the fuel tank 1, the fuel reformer 4, and the fuel supply device 8 to communicate with one another. In this system 30, through the first fuel supply passage 3, the raw fuel is supplied from the fuel tank 1 to the fuel reformer 4, and further, the reformed fuel produced in the fuel reformer 4 and the unreformed raw fuel are supplied to the fuel supply device 8. Hydrocarbons, and specifically, alcohol such as ethanol and an aromatic compound such as toluene can be used as the raw fuel.

A description is made of an operation of this system 30. In this system 30, first, the control unit 7 receives the data on the starting situation of the engine and the vehicle speed. Based on the variety of received data, the control unit 7 opens the first valve 2, and supplies the raw fuel stored in the fuel tank 1 through the first fuel supply passage 3 to the fuel reformer 4. In the fuel reformer 4, the discharge takes place in the raw liquid fuel, a part of the raw fuel is reformed, and the reformed gas containing hydrogen is produced. At this time, a discharge voltage is applied to the fuel reformer 4 by the voltage applying unit 6 which has received the signal from the control unit 7. The produced reformed fuel and the raw material are fed to the fuel supply device 8 through the first fuel supply passage 3. Then, the fuel supply device 8 supplies the reformed fuel and the raw fuel in a mixed state to the combustion chamber of the engine.

In the fuel supply system of the present invention, the device for producing the reformed fuel containing hydrogen without vaporizing the raw fuel is used as the fuel reformer. Therefore, the fuel reformer can be activated from the time of starting the engine, and the reformed fuel containing hydrogen can be rapidly supplied to the engine without damaging responsiveness of the system. Moreover, since it is not necessary to provide a heat exchanger and the like for vaporizing the raw liquid fuel, the system is not enlarged, and further, a cost increase following such enlargement can also be avoided. Furthermore, in the system 30 of this embodiment, the reformed fuel containing hydrogen and the unreformed raw fuel are mixed together, supplied to the combustion chamber of the engine 5, and burned. Such a mixed fuel of the reformed gas fuel and the raw liquid fuel can extend a lean limitation of the combustion. Accordingly, by using this system, efficient super-lean combustion can be realized, thus making it possible to improve a fuel consumption of the engine.

Figure 2:
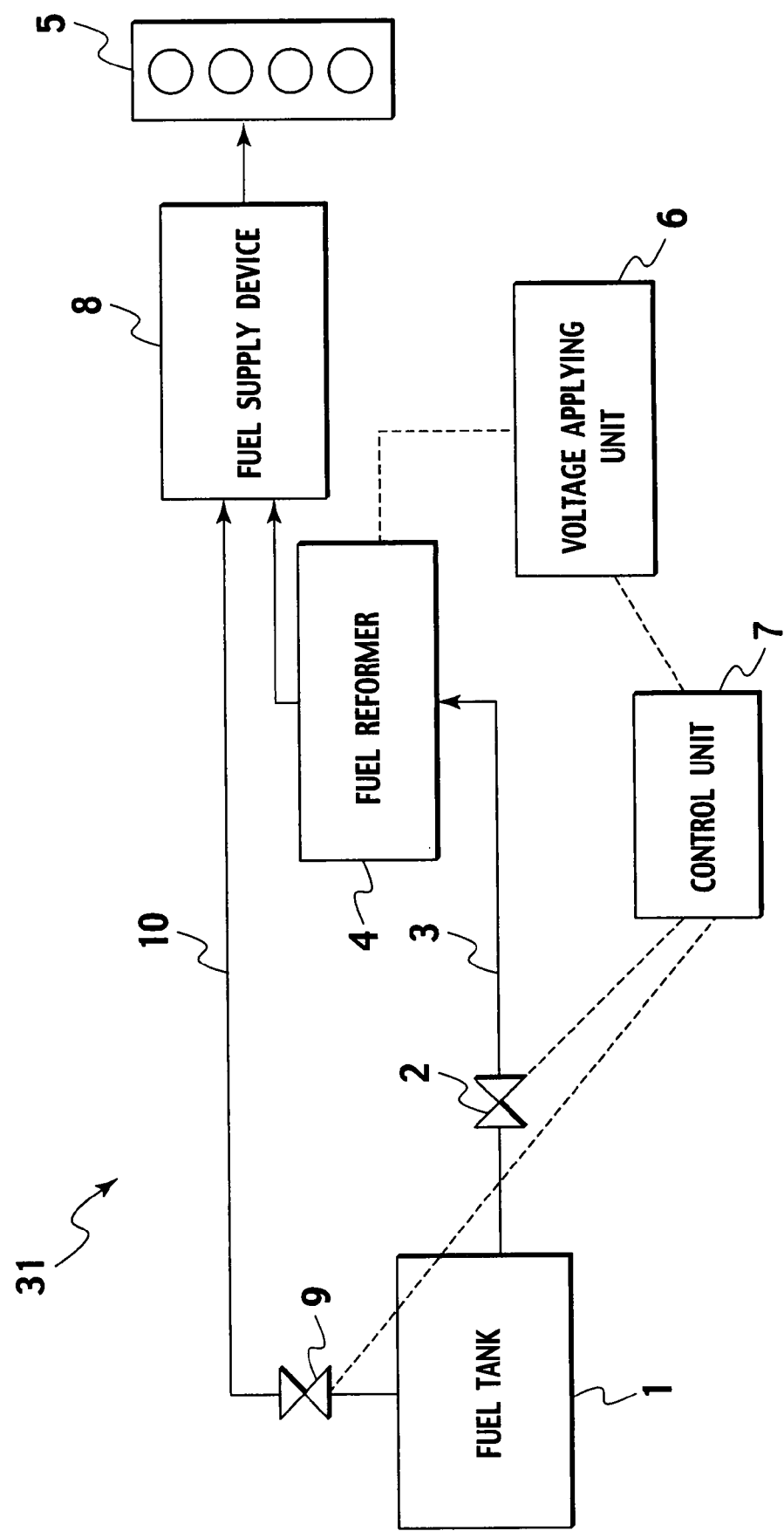
FIG. 2 is a schematic view showing a fuel supply system of Embodiment 2 in the present invention.

Next, a description is made of a fuel supply system of Embodiment 2. As shown in FIG. 2, a fuel supply system 31 of Embodiment 2 is characterized in that a second fuel supply passage 10 is further provided to the system 30 of Embodiment 1. The second fuel supply passage 10 directly connects the fuel tank 1 and the fuel supply device 8 to each other, and directly supplies the raw fuel in the fuel tank 1 to the fuel supply device 8 without passing the raw fuel through the fuel reformer 4. Moreover, a second valve 9 is further provided on the second fuel supply passage 10. The second valve 9 opens and closes based on a signal from the control unit 7 to adjust a fuel supply quantity to the fuel supply device 8.

An operation of this system 31 is described. In this system 31, as in the system 30 of Embodiment 1, the control unit 7 first receives the data on the starting situation of the engine and the vehicle speed. Based on the variety of received data, the control unit 7 opens the first valve 2, and supplies the raw fuel stored in the fuel tank 1 through the first fuel supply passage 3 to the fuel reformer 4. In the fuel reformer 4, the discharge takes place in the raw liquid fuel, the raw fuel is reformed, and the reformed gas containing hydrogen is produced. The produced reformed fuel is fed to the fuel supply device 8 through the first fuel supply passage 3. Moreover, in this embodiment, the second valve 9 is opened based on the signal from the control unit 7, and the raw fuel is directly supplied from the fuel tank 1 to the fuel supply device 8. The fuel supply device 8 mixes the reformed fuel and the raw fuel together, and supplies a mixture thus obtained to the combustion chamber of the engine 5.

As described above, in the system 31 of this embodiment, the supply quantities of the reformed fuel and the raw fuel are controlled by a supply controller composed of the control unit 7, the first valve, and the second valve. Specifically, in this embodiment, the openings of the first valve 2 and the second valve 9 are individually changed based on the signals from the controller 7, and the supply quantities of the reformed fuel and the raw fuel are thereby adjusted. Then, the reformed fuel and the raw fuel are supplied to the engine in a state where a mixing ratio thereof is the optimum. Hence, the optimum combustion can be performed in response to an output of the engine, thus making it possible to further improve the fuel consumption.

Moreover, in the system 31 of this embodiment, in response to an output state of the engine, only the raw fuel can be supplied to the engine by the second fuel supply passage 10, only the reformed fuel can be supplied to the engine by the first fuel supply passage 3, or further, appropriate quantities of the reformed fuel and the raw fuel can be individually supplied from both of the first fuel supply passage 3 and the second fuel supply passage 10. Hence, the engine can realize the optimum combustion state for an output required therefor, and an improvement of drivability can be achieved.

Figure 3:
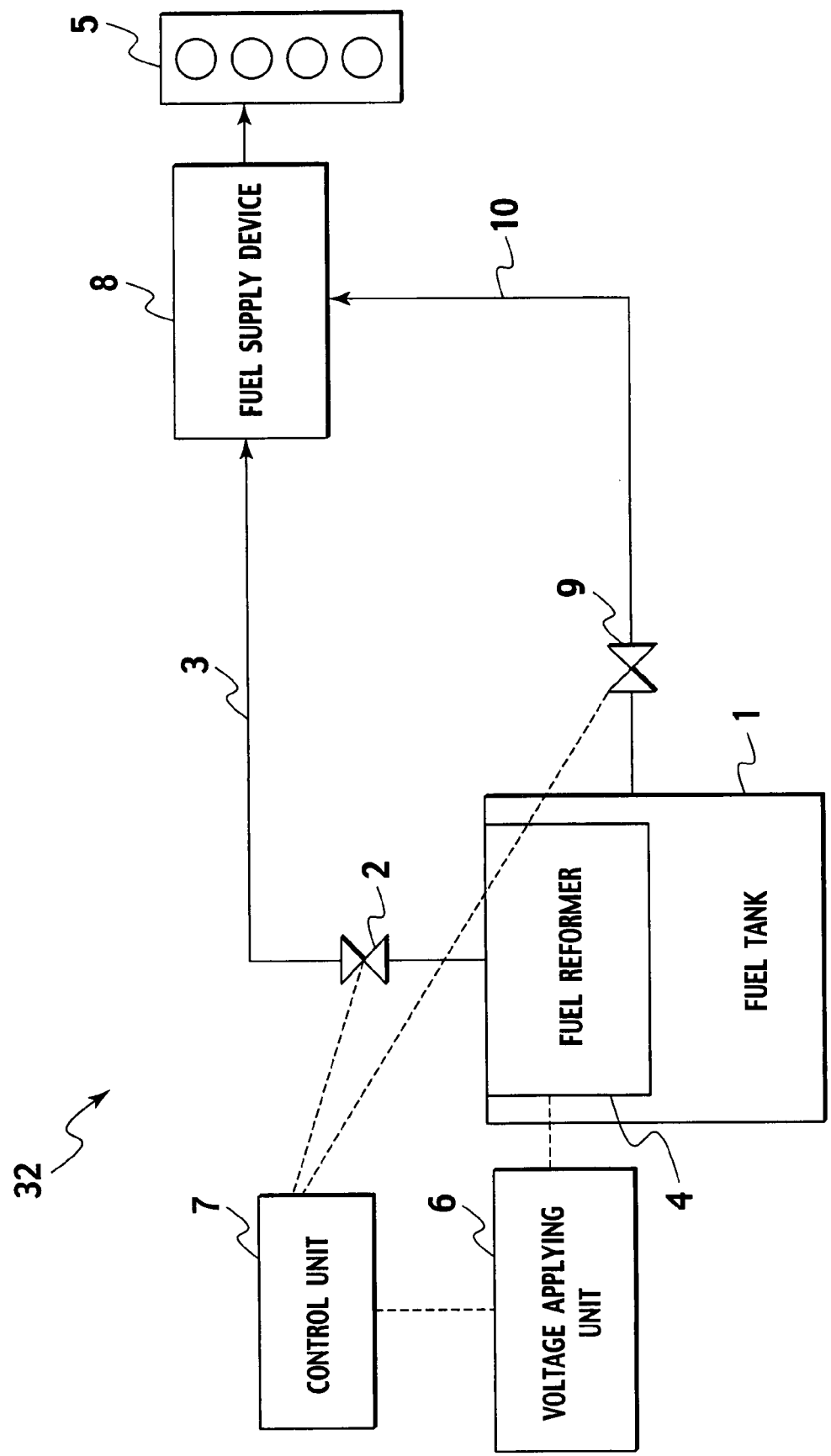
FIG. 3 is a schematic view showing a fuel supply system of Embodiment 3 in the present invention.

Next, a description is made of a fuel supply system of Embodiment 3. As shown in FIG. 3, a fuel supply system 32 of Embodiment 3 is characterized in that the fuel reformer 4 is provided in the fuel tank 1 as compared with the system 31 of Embodiment 2.

An operation of this system 32 is described. In this system 32, as in the system 31 of Embodiment 2, the control unit 7 first receives the data on the starting situation of the engine and the vehicle speed. Based on the variety of received data, the control unit 7 sends a signal to the voltage applying unit 6, and the voltage applying unit 6 applies a voltage to the electrodes provided in the fuel reformer 4 in the fuel tank 1, and produces the reformed fuel. Moreover, the control unit 7 opens the first valve 2, and supplies the produced reformed fuel to the fuel supply device 8. Furthermore, based the variety of data, the control unit 7 also opens the second valve, and directly supplies the raw fuel to the fuel supply device 8. Thereafter, the fuel supply device 8 mixes the reformed fuel and the raw fuel together, and supplies a mixture thus obtained to the engine 5.

As described above, in the system 32 of this embodiment, the fuel reformer 4 is provided in the inside of the fuel tank 1, and accordingly, simplification of the system can be achieved. Moreover, in the system 32 of this embodiment, as in Embodiment 2, the supply quantities of the reformed fuel and the raw fuel are adjusted in such a manner that the openings of the first valve 2 and the second valve 9 are individually changed based on the signals from the controller 7. Then, the reformed fuel and the raw fuel are supplied to the engine in a state where the mixing ratio thereof is the optimum. Hence, the optimum combustion can be performed in response to the output of the engine, thus making it possible to further improve the fuel consumption.

Figure 4:
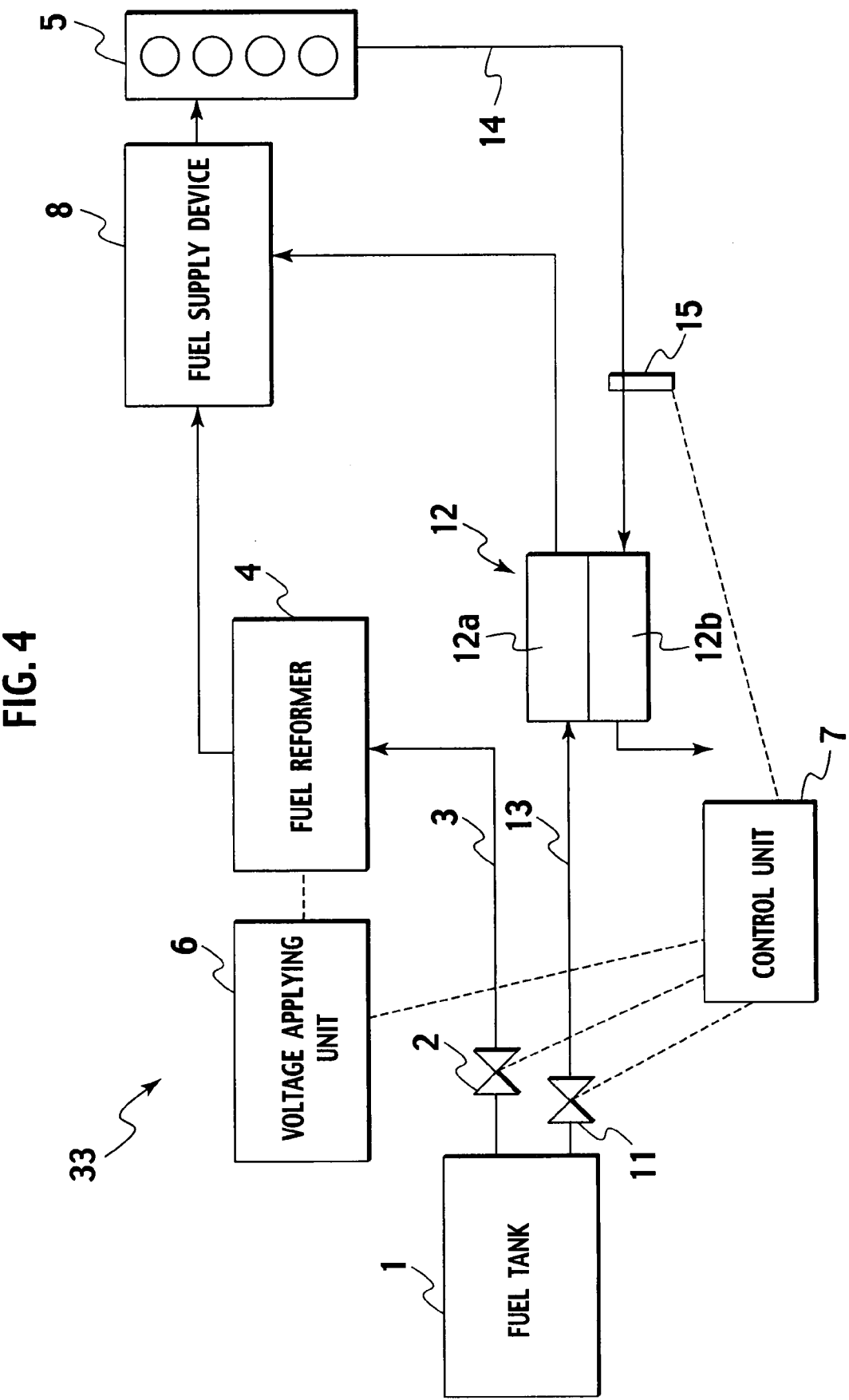
FIG. 4 is a schematic view showing a fuel supply system of Embodiment 4 in the present invention.

Next, a description is made of a fuel supply system of Embodiment 4. As shown in FIG. 4, a fuel supply system 33 of Embodiment 4 is characterized in that a third fuel supply passage 13 for supplying, to the engine 5, a fuel reformed by using a reforming catalyst using exhaust heat of the engine 5 is further provided to the system 30 of Embodiment 1. The third fuel supply passage 13 includes a third valve 11 and a catalyst reactor 12. The third valve 11 opens and closes based on a signal from the control unit 7, and adjusts a fuel supply quantity to the catalyst reactor 12. The catalyst reactor 12 is composed of a low-temperature portion 12a in which the reforming catalyst for reforming the raw fuel is provided, and of a high-temperature portion 12b into which high-temperature exhaust gas is introduced from the engine 5.

Moreover, in the system 33 of this embodiment, there is provided an exhaust passage 14 for introducing the high-temperature exhaust gas into the high-temperature portion 12b of the catalyst reactor 12 from the engine 5. Furthermore, on the exhaust passage 14, a temperature sensor 15 for measuring a temperature of the exhaust gas is provided. Data detected by the temperature sensor 15 is sequentially sent to the control unit 7.

In the catalyst reactor 12 of this embodiment, the exhaust heat of the exhaust gas emitted from the engine 5 is transmitted from the high-temperature portion 12b to the low-temperature portion 12a, the reforming catalyst and raw fuel of the low-temperature portion 12a are heated up, and the fuel reforming is performed by a catalytic function. This catalyst reactor will be described later in detail.

In this embodiment, at a time when a quantity of exhaust heat of the engine is small, such as a time of cold start and at a time of a low-output operation, the reformed fuel is produced by the electric discharge by using the fuel reformer 4. On the other hand, when the quantity of exhaust heat of the engine is large, for example, in a case of a high output operation, the fuel reforming is performed in the catalyst reactor 12. Moreover, in the system 33 of this embodiment, the supply quantities of the reformed fuel by the fuel reformer 4 and the reformed fuel by the catalyst reactor 12 are controlled by a selection controller composed of the control unit 7, the first valve 2, and the third valve 11. Specifically, in this embodiment, the openings of the first valve 2 and the third valve 11 are individually changed based on the signals from the control unit 7, and the supply quantities of the respective reformed fuels are thereby adjusted. Moreover, a control on selection as to which of the first fuel supply passage 3 and the third fuel supply passage 13 the supply of the fuel is performed by can be performed based on a temperature of the exhaust gas, which is detected by the temperature sensor 15.

As described above, in the system 33 of this embodiment, the optimum reforming method can be selected in accordance with the state of the engine. Accordingly, improvements of the fuel consumption, the drivability, startability, and the responsiveness can be achieved.

Figure 5:
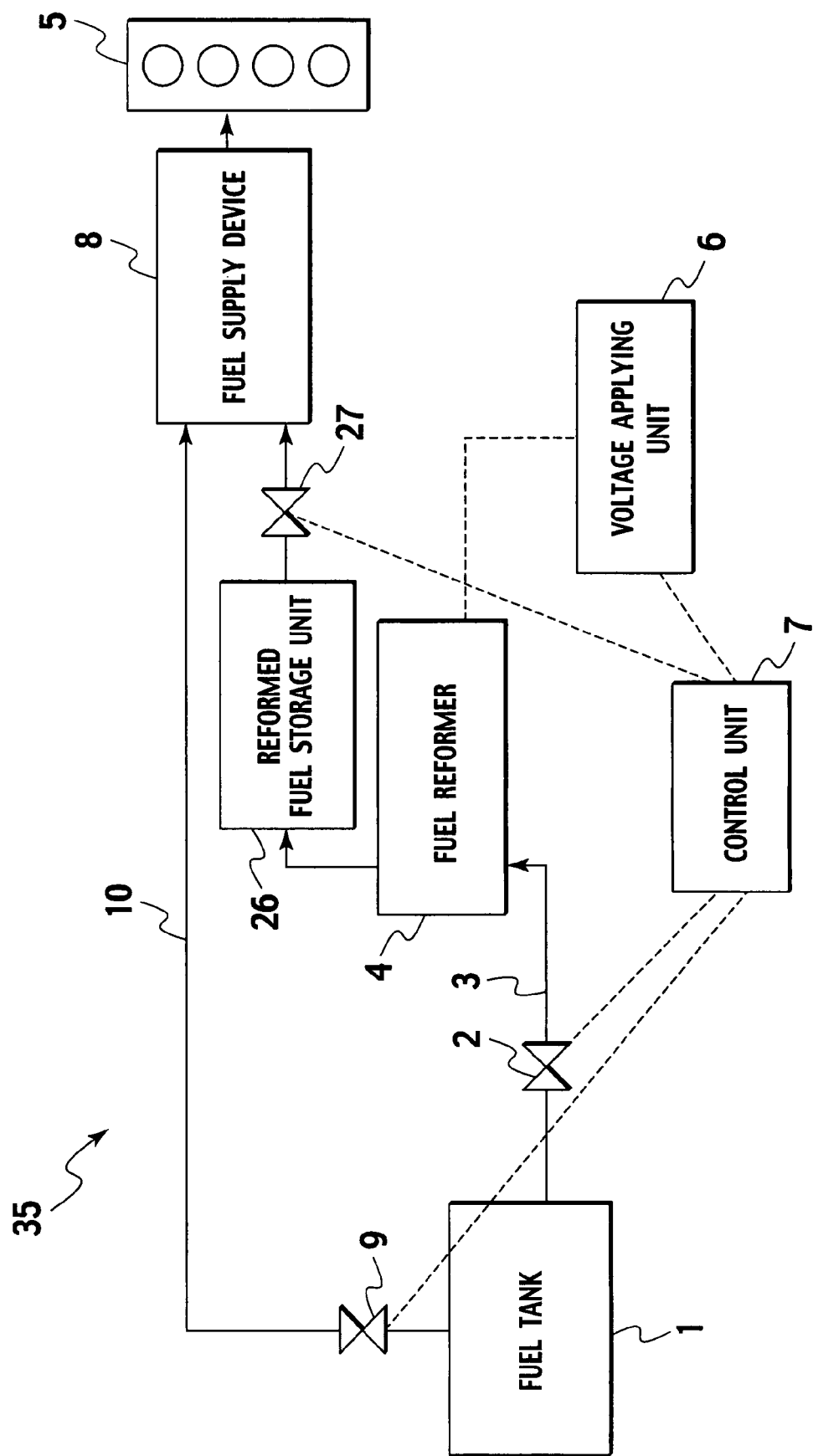
FIG. 5 is a schematic view showing a fuel supply system of Embodiment 5 in the present invention.

Next, a description is made of a fuel supply system of Embodiment 5. As shown in FIG. 5, a fuel supply system 35 of Embodiment 5 is characterized in that a reformed fuel storage unit 26 and a sixth valve 27 are provided to the system 31 of Embodiment 2. The reformed fuel storage unit 26 is provided between the fuel reformer 4 and the fuel supply device 8, and temporarily stores the reformed fuel produced by the fuel reformer 4. Moreover, the sixth valve 27 opens and closes based on a signal from the control unit 7 to adjust a supply quantity of the reformed fuel to the fuel supply device 8.

An operation of this system 35 is described. In this system 35, as in the system 30 in Embodiment 1, the control unit 7 first receives the data on the starting situation of the engine and the vehicle speed. Based on the variety of received data, the control unit 7 opens the first valve 2, and supplies the raw liquid material stored in the fuel tank 1 through the first fuel supply passage 3 to the fuel reformer 4. In the fuel reformer 4, the discharge takes place in the raw liquid fuel, the raw fuel is reformed, and the reformed gas containing hydrogen is produced. The produced reformed gas is fed though the first fuel supply passage 3 to the reformed fuel storage unit 26, and is temporarily stored therein. Then, when the reformed fuel is supplied to the fuel supply device 8, the sixth valve 27 is opened based on a signal from the control unit 7. Moreover, in this embodiment, the second valve 9 is opened based on the signal from the control unit 7, and the raw fuel is directly supplied to the fuel supply device 8 from the fuel tank 1. The fuel supply device 8 mixes the reformed fuel and the raw fuel together, and supplies the mixture thus obtained to the combustion chamber of the engine 5.

As described above, in the system 35 of this embodiment, the supply quantities of the reformed fuel and the raw fuel are controlled by a supply controller composed of the control unit 7, the second valve 9, and the sixth valve 27. Specifically, in this embodiment, the openings of the second valve 9 and the sixth valve 27 are individually changed based on the signals from the control unit 7, and the supply quantities of the reformed fuel and the raw fuel are thereby adjusted. Then, the reformed fuel and the raw fuel are supplied in a state where the mixing ratio thereof is the optimum. Hence, the optimum combustion can be performed in response to the output of the engine, thus making it possible to further improve the fuel consumption.

Moreover, in this embodiment, the gas which passes through the first fuel supply passage 3 and is reformed in the fuel reformer 4 is once stored in the reformed fuel storage unit 26, and accordingly, based on an instruction from the control unit 7, the reformed gas can be supplied from the sixth valve 27 to the engine 5 without delay, and the improvements of the startability and the responsiveness can be achieved.

Figure 6:
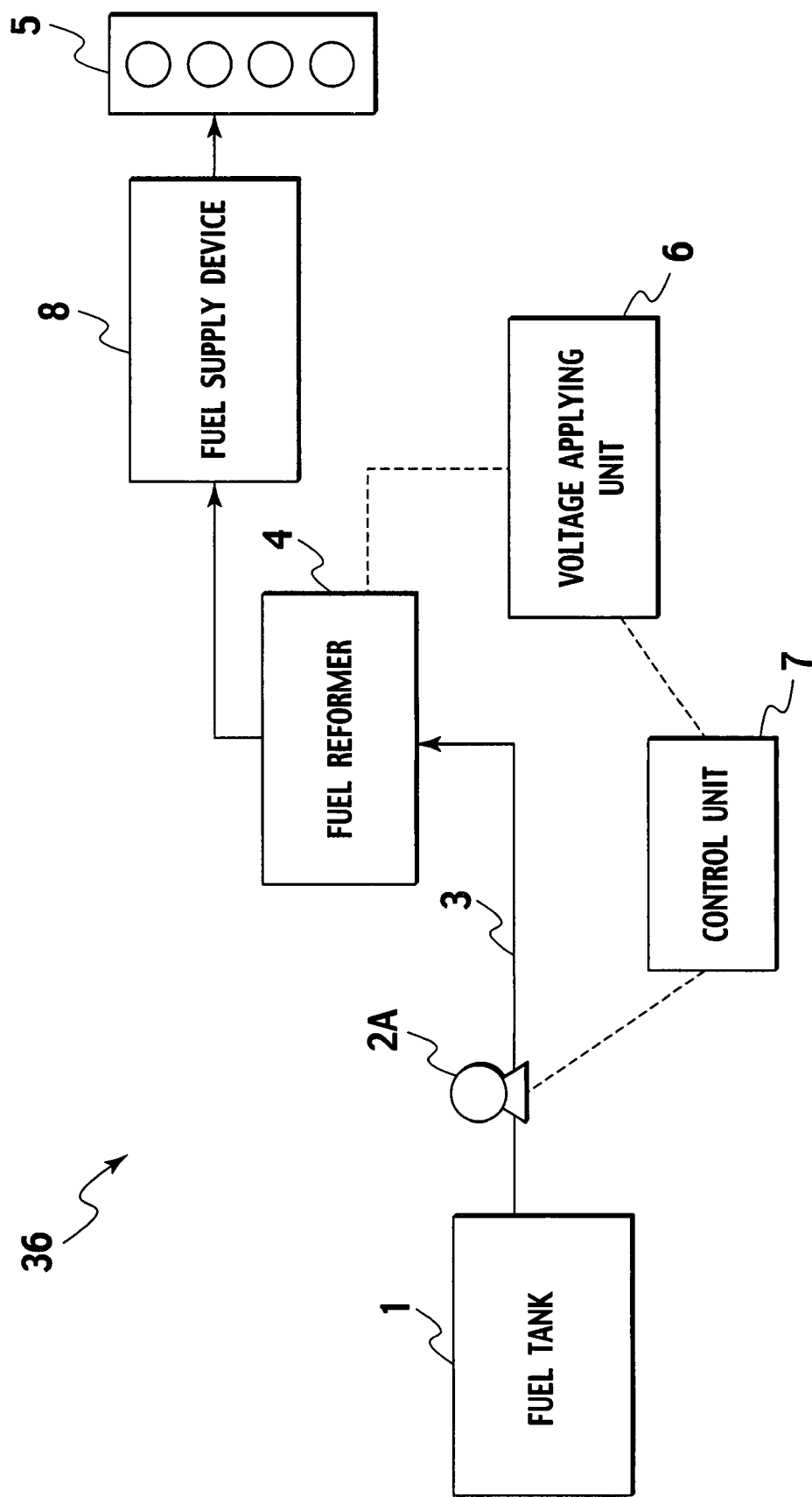
FIG. 6 is a schematic view showing a fuel supply system of another embodiment in the present invention.

Note that, though the supply quantities of the fuels are controlled by opening and closing the valves in the above-described system, such a supply quantity may be controlled by using a pump 2A as shown in FIG. 6. However, though not shown, the supply quantity may be controlled by combining the valve and the pump.

Next, a description is made in detail of the fuel reformer in the fuel supply system of the present invention.

(Fuel Reformer)

Figure 7:
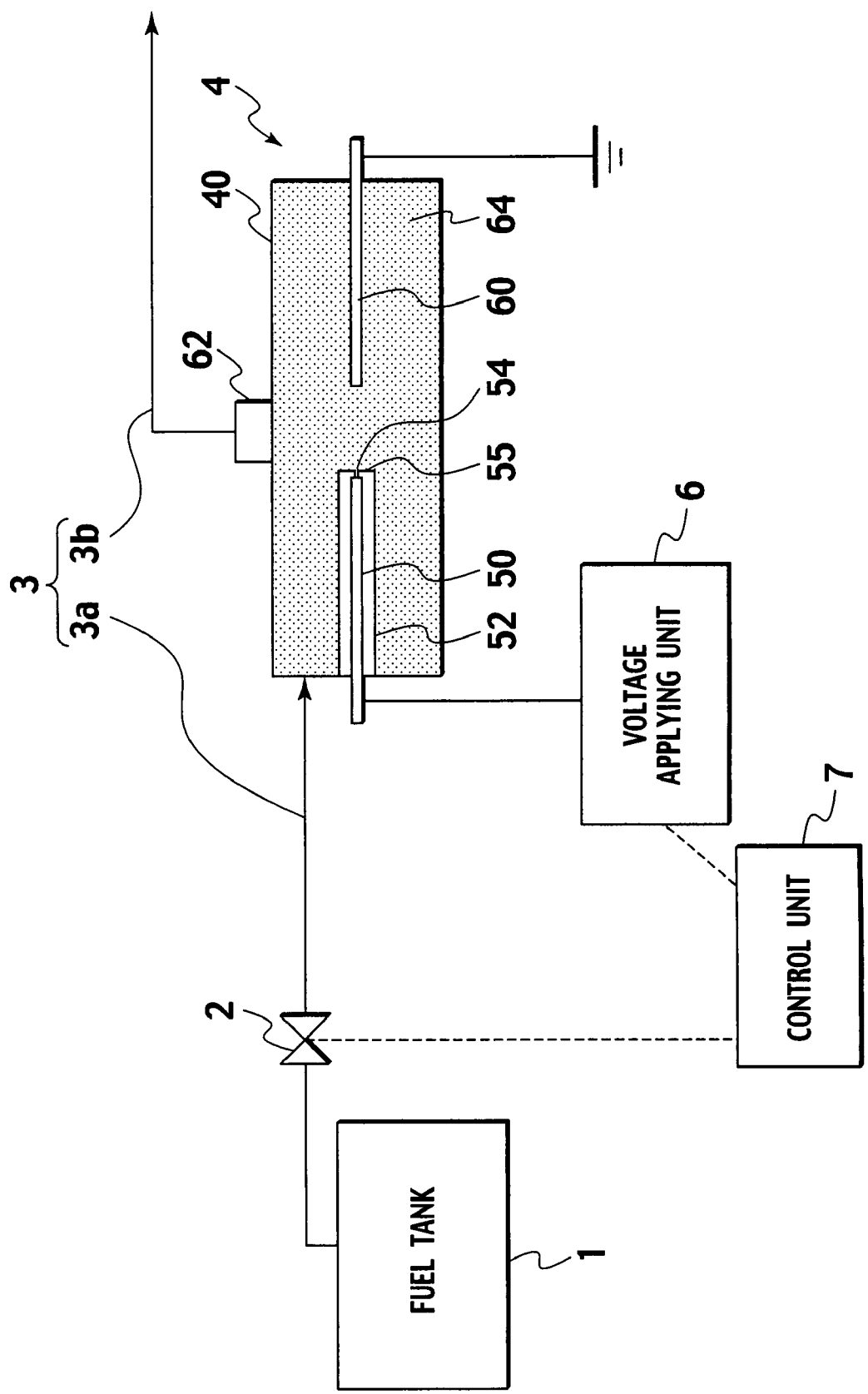
FIG. 7 is a schematic view showing an example of a fuel reformer in the present invention.

In FIG. 7, a preferred embodiment of the fuel reformer of the present invention is shown. The fuel reformer 4 is a device for producing the reformed fuel (hydrogen-containing gas) by reforming the raw fuel (liquid fuel) by discharge plasma. Note that FIG. 7 is a view showing a state of a stationary operation state of the fuel reformer 4, where a liquid fuel 64 is filled in an inside of a reaction container 40.

The fuel reformer 4 is connected through the first fuel supply passage 3 to the fuel tank 1. This fuel tank 1 stores the liquid fuel 64. In this embodiment, the liquid fuel 64 is iso-octane as a hydrocarbon compound. However, other compounds may be used as the liquid fuel 64, and hydrocarbon compounds such as gasoline, kerosene and naphtha and alcohols such as methanol, ethanol, propanol and butanol can be used as the liquid fuel 64. From a viewpoint of availability, methanol and ethanol are preferably used. In particular, ethanol is less toxic, and is available from the biomass, and accordingly, is preferably used also from a viewpoint of the environmental preservation. Moreover, hydrocarbon containing an aromatic compound can also be used as the liquid fuel 64. The discharge in the hydrocarbon (for example, gasoline) containing the aromatic compound (for example, toluene) decomposes the aromatic compound in the fuel to generate low-molecular hydrocarbons thereby reforming the fuel not containing the aromatic compound. Accordingly, combustibility of the fuel is improved, and an occurrence of soot in the exhaust gas is restricted. With regard to these fuels, only a type thereof may be used independently, or two or more types thereof may be used in combination. When two of more types of the fuels are used in combination, the respective fuels may be stored in separate fuel tanks, and may be supplied through separate raw fuel supply passages 3a to the reaction container 40. Alternatively, the fuels may be stored as a mixed fuel in one fuel tank, and may be supplied through the one raw fuel supply passage 3a to the reaction chamber 40.

The raw fuel supply passage 3a is connected to the fuel tank 1. Moreover, the first valve 2 electrically controlled by the control unit 7 is provided midway of the raw fuel supply passage 3a. By opening and closing the first valve 2, the liquid fuel 64 is supplied from the fuel tank 1 through the raw fuel supply passage 3a to the reaction container 40 at a predetermined flow rate.

On a downstream side of the first valve 2, the cylindrical reaction container 40 is provided. Note that a shape of the reaction container 40, a connected position of the raw fuel supply passage 3a to the reaction chamber 40, and an installed position of the first valve 2 on the raw fuel supply passage 3a are not limited only to illustrated modes.

The reaction chamber 40 includes a pair of electrodes (50, 60) inserted from both of cylindrical bottom surfaces thereof. Among the electrodes, one electrode 50 is electrically connected to the voltage applying unit 6 disposed outside of the reaction container 40. The voltage applying unit 6 is electrically controlled by the control unit 7, and applies a voltage to the electrode 50 connected to the voltage applying unit 6. Moreover, the other electrode 60 is disposed so as to be opposed to the electrode 50, and an end of the electrode 60 is grounded. These electrodes (50, 60) and the voltage applying unit 6 function as plasma generating means for generating plasma in the reaction chamber 40 by the electric discharge.

Figure 8:
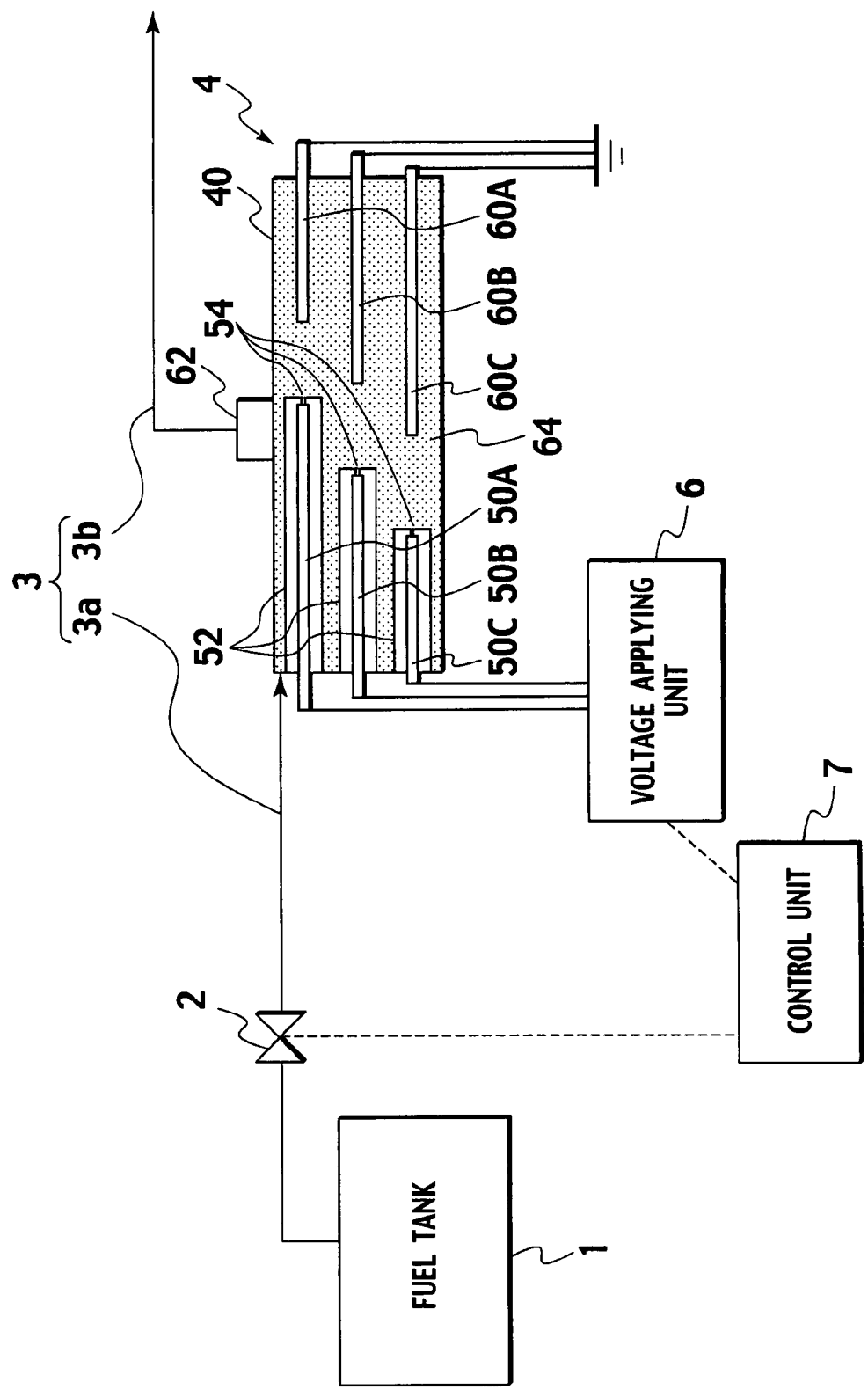
FIG. 8 is a schematic view showing another example of the fuel reformer in the present invention.

The electrodes for use in the fuel reformer 4 of this embodiment are a pair as shown in FIG. 7. However, if possible, plural pairs of the electrodes may be arranged in the reaction chamber 40 as shown in FIG. 8. In a mode shown in FIG. 8, three pairs of the electrodes are arranged, and electrodes (50A, 50B, 50C) as ones of the pairs are connected to the voltage applying unit 6, and the other electrodes (60A, 60B, 60C) of the pairs are grounded. Note that, when the plural pairs of electrodes are arranged in the reaction container 40, it is preferable that, as shown in FIG. 8, the respective pairs of electrodes be arranged to be positionally shifted from one another so that discharge plasma generated between each pair of electrodes cannot interfere with the other discharge plasmas.

In this embodiment, the respective electrodes (50, 60) among the pair are made of stainless steel. However, the electrodes may be made of other materials such as an aluminum-copper alloy, a titanium alloy, aluminum, copper, and carbon. The electrodes may be made of still other materials as long as the materials do not adversely affect the fuel and the hydrogen-containing gas to be produced, and function as the plasma generating means.

In this embodiment, a shape of the electrodes is columnar. However, other shapes such as a rectangular solid shape and a triangular prism shape may be employed as long as the electrodes function as the plasma generating means.

Moreover, in this embodiment, a diameter of the electrodes is 2 mm, and a distance between the opposite electrodes is 6 mm. These sizes are not limited only to such values, and are appropriately adjusted in consideration for a type of the fuel, an internal pressure of the reaction chamber, the applied voltage to the electrodes, and manufacturing cost of the electrodes. Examples of the sizes are mentioned. The diameter of the electrodes is usually 1 to 7 mm, and preferably 2 to 5 mm.

Moreover, the distance between the opposite electrodes is usually 3 to 10 mm, and preferably 5 to 7 mm. When the distance between the electrodes is too short, there is an apprehension that there occurs a problem that the electrodes become prone to contact with each other and to be short-circuited. On the other hand, when the distance between the electrodes is too long, the electric discharge becomes difficult to occur between the electrodes. However, as a matter of course, electrodes having other than these values may be employed.

In this embodiment, surfaces of the electrodes 50 connected to the voltage applying unit 6 and located in the inside of the reaction container 40, are coated with an insulating material to form coated portions 52. However, each electrode 50 has an exposed portion 54, a region which is not coated with the insulating material on the surface opposite to each electrode 60, specifically, on the center portion of the bottom surface of the column constructing the electrode 50 inside the reaction container 40. The exposed portions 54 are composed as circular regions with a diameter of 0.5 mm, which are not coated with epoxy resin.

In this embodiment, the insulating material constructing the coated portions 52 is epoxy resin. However, the insulating material is not limited only to such a mode, and materials which stably ensure the insulation without making interaction with the liquid fuel are used similarly. As the insulating materials other than the epoxy resin, there are mentioned polytetrafluoroethylene, polypropylene, polyethylene, polycarbonate, polyvinyl chloride, polyvinylidene chloride, polystyrene, and the like. Other insulating materials may be used.

No particular limitations are imposed on a shape of the exposed portions 54, either. Besides the circular shape, a square, rectangle, triangle, pentagon, and any other shapes are employed. Moreover, when the exposed portions 54 are circular, a diameter thereof is not particularly limited. However, the diameter is preferably. 1 mm or less, more preferably 0.5 to 1 mm. According to such a mode, a stable electric discharge is achieved. According to another preferred mode, a ratio of an area of the exposed portions with respect to a total area of the coated portions and the exposed portions is preferably 1 to 20%, more preferably, 5 to 10%. Moreover, according to still another preferred embodiment, an area of the exposed portions 54 present on the surfaces 55 opposite to the electrodes 60 is preferably 0.5 to 10 mm$^2$, more preferably, 1 to 5 mm$^2$.

In this embodiment, the exposed portions 54 are present only on the surfaces of the electrodes 50 which are connected to the voltage applying unit 6, and are opposite to the electrodes 60. However, if the plasma is generated efficiently between the electrodes 50 and 60, a mode where the exposed portions 54 are present on other surfaces can also be employed.

On the upper portion of the reaction chamber 40, a gas collecting portion 62 is provided. On a downstream side of the gas collecting portion 62, a reformed fuel supply passage 3b is provided. These gas collecting portion 62 and reformed fuel supply passage 3b function as an emission unit for emitting, from the reaction container 40, the hydrogen-containing gas produced by the contact of the liquid fuel and the plasma. Note that a specific gravity of the produced hydrogen-containing gas is generally smaller than that of the liquid fuel. Accordingly, in usual, the produced gas moves to an upper portion of the reaction container 40. Hence, in this embodiment, the gas collecting portion 62 and the reformed fuel supply passage 3b are provided on a center of the upper portion of the reaction container. However, installed positions of the gas collecting portion 62 and the reformed fuel supply passage 3b to the reaction chamber 40 are not limited only to those of the illustrated mode.

Subsequently, an operation of the fuel reformer 4 shown in FIG. 7 is described.

First, an activation signal is outputted from the control unit 7 to the first valve 2, and the first valve 2 is opened. By opening the first valve 2, the liquid fuel 64 is supplied from the fuel tank 1 through the raw fuel supply passage 3a to the reaction chamber 40.

In this embodiment, a supply method of the liquid fuel 64 is a continuous flow method. The supply quantity of the liquid fuel 64 is controlled in response to the quantity of the hydrogen-containing gas produced by the discharge plasma and emitted from the reformed fuel supply passage 3b. By such a control, the state where the liquid fuel 64 is filled in the reaction container 40 is maintained in the stationary operation state shown in FIG. 7. Note that the supply quantity of the liquid fuel 64 is controlled by the first valve 2 connected to the control unit 7. Moreover, a specific value of the supply quantity of the liquid fuel 64 is varied in response to a rate of consumption of the liquid fuel 64 in the reaction container 40 by the reforming, and accordingly, is not determined uniquely.

As described above, in the stationary operation state, the liquid fuel 64 is filled in the reaction container 40. The activation signal is outputted from the control unit 7 to the voltage applying unit 6 in this state, and the voltage applying unit 6 is activated. By this activation of the voltage applying unit 6, the voltage is applied to the electrode 50 connected to the voltage applying unit 6, and a potential difference occurs between the electrode 50 concerned and the grounded electrode 60. As a result, the discharge occurs between the pair of electrodes 50, 60 to generate plasma. The liquid fuel 64 filled in the reaction container 40 is reformed by contacting the plasma, and the hydrogen-containing gas is produced. The produced hydrogen-containing gas is emitted from the reaction container 40 through the gas collecting portion 62 and the reformed fuel supply passage 3b, which are installed on the reaction chamber 40, and is fed to the engine 5. Moreover, in this case, the hydrogen-containing gas may be fed to the engine 5 through the gas collecting portion 62 and the reformed fuel supply passage 3b in a state of being mixed with the liquid fuel 64.

A magnitude of the voltage applied to the electrode 50 by the activation of the voltage applying unit 6 is not particularly limited, and is appropriately set in consideration for desired reforming performance. As an example, the applied voltage is approximately 0.1 to 50 kV in usual, and preferably 1 to 10 kV. When the applied voltage is too small, there is an apprehension that the plasma is not sufficiently generated, and that the reforming of the fuel does not successfully advance. On the other hand, when the applied voltage is too large, there is an apprehension that reforming efficiency is decreased in addition to an increase of danger. However, according to the case, a voltage other than this range may be applied. No particular limitations are imposed on a type of the electric discharge for generating the plasma, either. As the type of electric discharge to be employed, there are mentioned a pulse discharge, corona discharge, glow discharge, arc discharge, and the like. The plasma may be generated by another electric discharge such as a barrier discharge. Preferably, the pulse discharge is used from a viewpoint of energy efficiency and cost. When the pulse discharge is used, the number of pulses in the pulse discharge is not particularly limited; however, preferably, 5 to 500 times/sec, more preferably, 50 to 100 times/sec. When the number of pulses is too small, there is an apprehension that the plasma is not generated sufficiently, and that the reforming does not successfully advance. However, the pulse discharge may be performed by the number of pulses, which goes out of this range.

In the case of reforming the fuel by using the fuel reformer 4 of the present invention, the fuel is reformed by the contact thereof with the plasma generated by the electric discharge. Hence, the reforming reaction advances without heating up the reaction container 40 itself. Therefore, according to the fuel reformer of the present invention, installation of heating means such as a heater is omitted, which also contributes to compacting of the apparatus effectively. However, it is allowable to install the heating means such as the heater according to needs, and to heat up the liquid fuel 64 and the reaction container 40. For example, when the liquid fuel is desired to be heated up, the heater just needs to be installed midway of the raw fuel supply passage 3*a*. When the reaction container 40 is desired to be heated up, the heater just needs to be installed on the periphery of the reaction container 40. A temperature in the reaction chamber 40 is not particularly limited. However, preferably, the temperature is approximately 0 to 50° C., more preferably, 5 to 30° C. Specifically, according to the fuel reformer of the present invention, the reforming of the fuel advances under a condition of room temperature.

As described above, in the fuel reformer 4 of this embodiment, the electrode 50 connected to the voltage applying unit 6 includes the coated portion 52 in which the surface located in the inside of the reaction container 40 is coated with the insulating material, and the exposed portion 54 in which the surface is not coated with the insulating material. With such a construction, even if an insulating film, which has been heretofore regarded necessary for the reforming of the liquid fuel by using the discharge plasma, is not provided, the reforming advances efficiently, thus making it possible to generate the hydrogen-containing gas. A mechanism in which such an effect is obtained with the construction of the present invention has not been obvious yet. However, in an electric discharge using an electrode of which surface is entirely exposed, the electric discharge occurs in a form in which the discharge is dispersed entirely on the surface of the electrode. Therefore, it is difficult to generate the plasma locally concentrated. It is thought that an insulating film including a pinhole, which is provided in a reaction container of the conventional fuel reformer, concentrates the dispersed electric discharge to a portion of the pinhole, thus making it possible to generate the plasma locally concentrated. As opposed to this, in the fuel reformer of the present invention, the surface of the electrode connected to the voltage applying unit includes the coated portion coated with the insulating material, and the exposed portion which is not coated therewith. Therefore, on the electrode connected to the voltage applying unit, an electric discharge area is restricted, and the electric discharge occurs concentratedly only on the exposed portion. It is estimated that the plasma is generated to be so locally concentrated that the fuel is reformed efficiently. However, the technical scope of the present invention is to be determined based on the description of the claims, and the technical scope of the present invention is not affected at all even if the improvement effect of the reforming efficiency by the present invention is obtained by a mechanism other than the above-described mechanism.

The description has been made above of the mode of singly supplying the liquid fuel 64 to the reaction container 40 and producing the hydrogen-containing gas by the contact thereof with the plasma. However, according to the case, a component other than the liquid fuel 64 may be supplied to the reaction container 40 for the purpose of improving the reforming efficiency. As an example of the component other than the liquid fuel supplied to the reaction container 40, water is mentioned. When the water is supplied in addition to the liquid fuel, a content of hydrogen in the obtained hydrogen-containing gas is increased. A supply mode of the water is not particularly limited. The water may be supplied in such a manner that a water tank is provided separately from the fuel tank 1, and that a water supply passage is provided separately from the raw fuel supply passage 3*a*. Alternatively, in the case of using a fuel, such as the ethanol, which can be mixed with the water, the fuel may be stored as a mixture thereof with the water in the fuel tank 1 in advance, and the mixture may be supplied from the raw fuel supply passage 3*a* to the reaction container 40. In such a mode, a supply quantity of the water is not particularly limited; however, it is recommended to supply the water so that water molecules can be 1 to 10 moles, preferably, 1 to 3 moles, with respect to 1 mole of the fuel (for example, ethanol) molecules.

The hydrogen-containing gas produced in the fuel reformer 4 of the present invention is used for the combustion in the engine 5; however, can be also used for various other purposes which require the hydrogen gas. As such purposes, there are mentioned a fuel of a fuel cell, a material for syntheses in the chemical industry, a fuel for an internal combustion engine, and the like.

Specifically, the above-described hydrogen-containing gas is used as a fuel of a high-temperature operation-type molten carbonate fuel cell (MCFC), solid oxide fuel cell (SOFC), or the like. In such a case, carbon monoxide gas, hydrocarbon gas or the like other than the hydrogen gas is also used as the fuel. Hence, in such a purpose, the hydrogen-containing gas obtained from the fuel reformer of the present invention just needs to be directly used as the fuel without being further subjected to a special treatment.

As opposed to this, when the above-described hydrogen-containing gas is directly used as a fuel for low-temperature operation-type polymer electrolyte fuel cell (PEFC) or the like, carbon monoxide contained in the gas concerned sometimes functions as a catalytic poison for a platinum catalyst in an electrode catalyst layer constructing a stack of the PEFC. Hence, it is recommended that means for reducing a concentration of the carbon monoxide in the above-described hydrogen-containing gas be installed at a subsequent stage of the fuel reformer of the present invention, and that the hydrogen-containing gas be thereafter supplied as the fuel to the fuel cell. As such means for reducing the concentration of the carbon monoxide, there are mentioned a shift reactor for shifting CO to $CO_2$ by CO shift reaction ($CO+H_2O \rightarrow CO_2 + H_2$), a selective oxidation reactor for changing CO to $CO_2$ by a selective oxidation reaction ($2CO+O_2 \rightarrow 2CO_2$) of the carbon monoxide, and the like. Note that it is also possible to obtain the high-purity hydrogen gas by means such as a low-temperature separation method, a PAS method, a hydrogen storing alloy, a palladium membrane diffusion method, or the like, as well as the above-described means.

A description is made below of the fuel reformer of the present invention in more detail by examples; however, the technical scope of the present invention is not limited only to the following examples.

EXAMPLE 1

The iso-octane was reformed in a liquid phase by using the fuel reformer of the mode shown in FIG. 7, and the hydrogen-containing gas was produced.

The temperature inside the reaction chamber 40 was maintained at 30° C., and a voltage of 5 kV was applied between the electrodes (50, 60) by the activation of the voltage applying unit 6. In such a way, the electric discharge was stably generated between the electrodes (50, 60), the iso-octane was reformed, and the hydrogen-containing gas was produced.

The produced gas was emitted to the outside of the reaction container 40 through the gas collecting portion 62 and the reformed fuel supply passage 3b. The hydrogen-containing gas thus emitted was collected, and a component composition of the gas concerned was analyzed by gas chromatography. Moreover, a production rate of the hydrogen-containing gas was determined. The component composition of the hydrogen-containing gas, which was obtained by the analysis, and the production rate of the hydrogen-containing gas are shown in Table 1 below. Moreover, a change in the hydrogen production rate, which follows an elapse of a reforming time in this example, is shown in a graph of FIG. 11.

EXAMPLE 2

The iso-octane was reformed in the liquid phase by using the fuel reformer of the mode shown in FIG. 8 to generate the hydrogen-containing gas.

The fuel reformer 4 shown in FIG. 8 is similar to the fuel reformer 4 of the mode shown in FIG. 7 except that the reaction container 40 includes the three pairs of electrodes (50A and 60a, 50B and 60B, and 50C and 60C). Specifically, of the three pairs of electrodes, the electrodes (50A, 50B and 50C) as ones of the three pairs are connected to the voltage applying unit 6. Then, the surfaces of the electrodes connected to the voltage applying unit 6 and located in the inside of the reaction container 40, are coated with the epoxy resin as the insulating material, and form the coated portions 52. Moreover, the exposed portions 54 with a diameter of 0.5 mm, which are not coated with the epoxy resin, are present on the centers of the surfaces opposite to the other electrodes (60A, 60B and 60C) in the surfaces of these electrodes. Then, these three pairs of electrodes are installed in the reaction container 40 so that the electric discharge in each pair of the electrodes cannot interfere with the electric discharges in the other pairs, and specifically, so that, at a place apart from one electric discharge area (between a pair of the electrodes for executing the discharge) by the inter-electrode distance or more, another electric discharge area can be located.

The reforming was performed by similar conditions to those of Example 1 described above except that the voltage of 5 kV was applied between each pair of the electrodes, the hydrogen-containing gas was produced, and a component composition of the gas concerned was analyzed. Moreover, a production rate of the hydrogen-containing gas was determined. The component composition of the hydrogen-containing gas which was obtained by the analysis, and the production rate of the hydrogen-containing gas are shown in Table 1 below.

COMPARATIVE EXAMPLE 1

Figure 9:
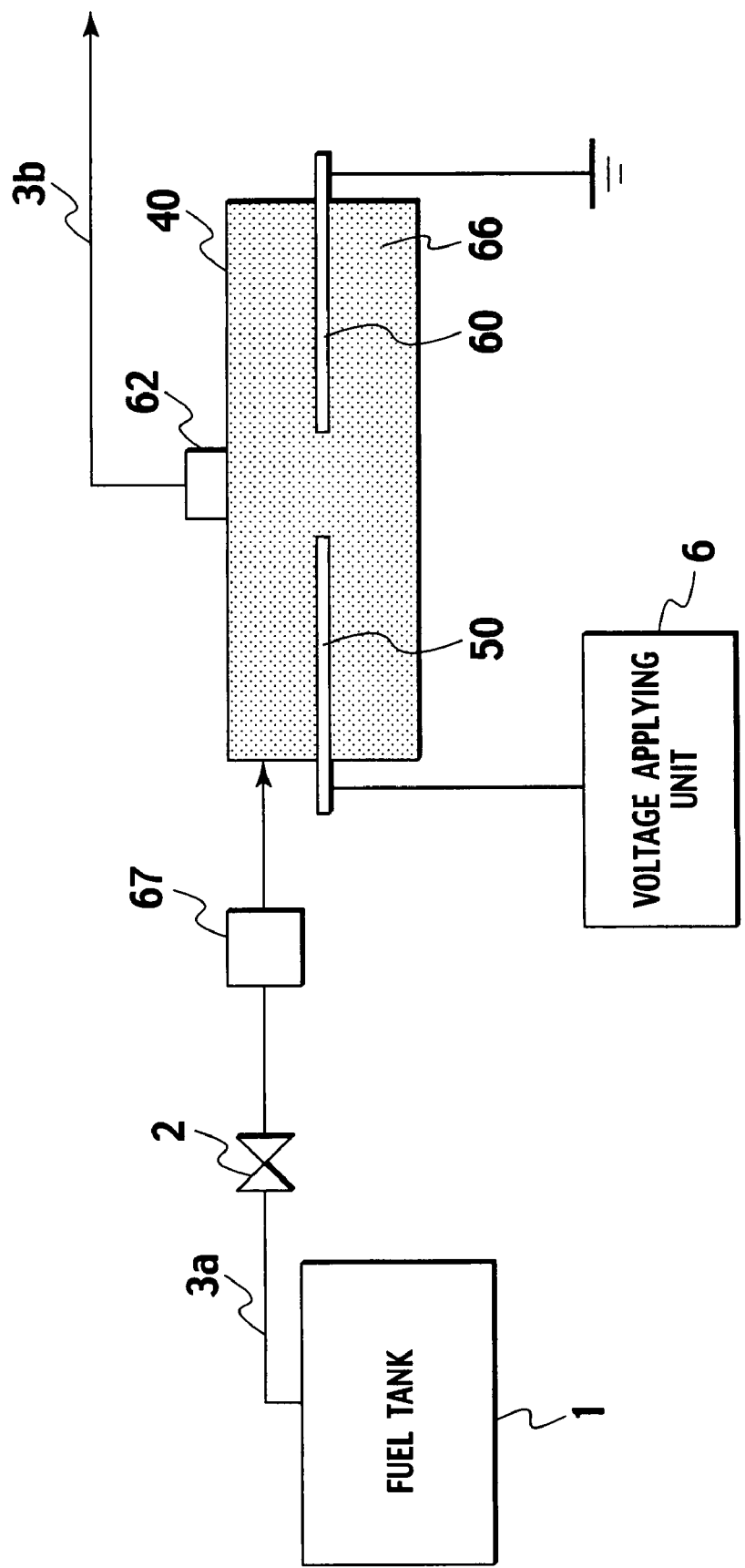
FIG. 9 is a schematic view showing a fuel reformer of Comparative Example 1.

The iso-octane was reformed in the liquid phase by using a fuel reformer of a mode shown in FIG. 9, and the hydrogen-containing gas was produced.

The fuel reformer shown in FIG. 9 is different from the fuel reformer 4 of the mode shown in FIG. 7 in that the surface of the electrode 50 connected to the voltage applying unit 6 is not coated with the insulating material, and that a vaporizer 67 for vaporizing the iso-octane in a liquid state is installed on a downstream side of the first valve 2 in the raw fuel supply passage 3a.

The reforming was performed by similar conditions to those of Example 1 described above except that the iso-octane was vaporized by the vaporizer 67 and supplied to the reaction container 40, and the hydrogen-containing gas was produced. Note that, in a stationary operation state of the fuel reformer shown in FIG. 9, a gas fuel 66 is filled in the reaction container 40. A specific gravity of the obtained hydrogen-containing gas is smaller than that of the above-described gas fuel. Accordingly, as in the above-described examples, the hydrogen-containing gas was emitted from the reaction container 40 through the gas collecting portion 62 and the reformed fuel supply passage 3b, which are installed on the reaction chamber 40.

Figure 11:
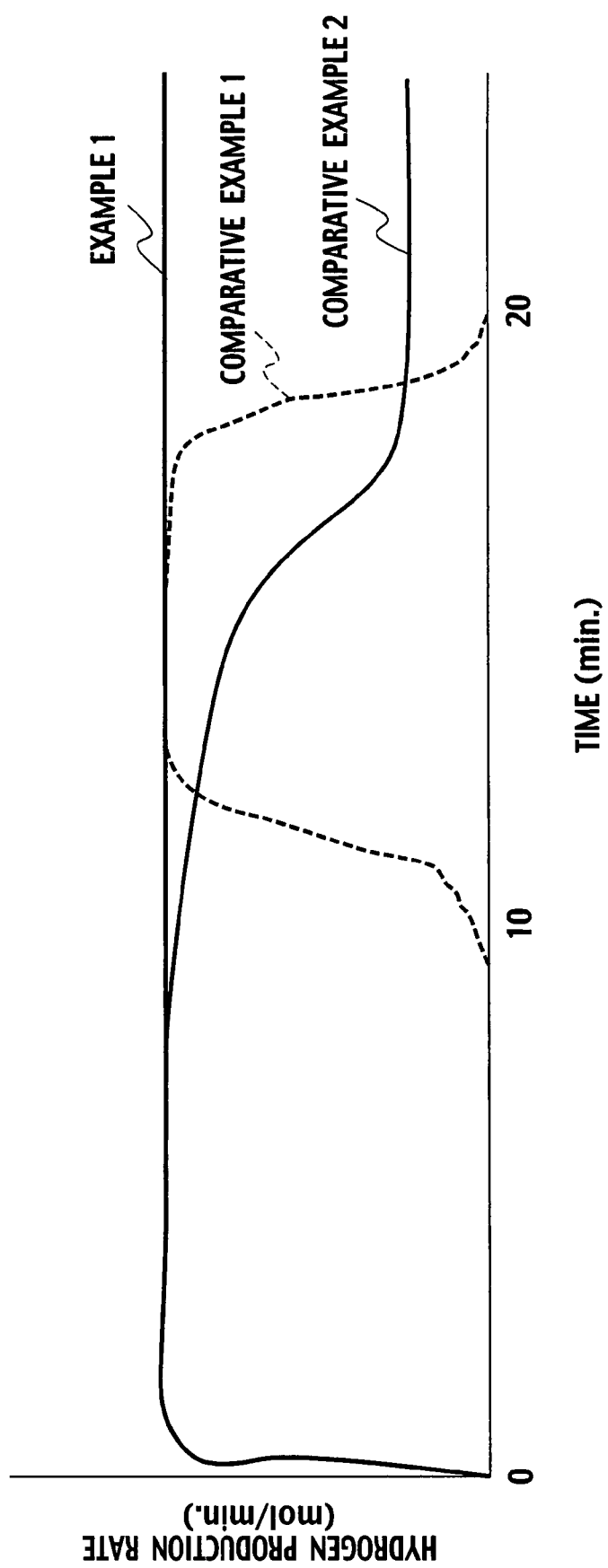
FIG. 11 is a graph showing changes of hydrogen production rates, which are caused by an elapse of a reforming time, in Example 1 and Comparative Examples 1 and 2.

A component composition of the hydrogen-containing gas obtained by the reforming was analyzed. Moreover, a production rate of the hydrogen-containing gas was determined. The component composition of the hydrogen-containing gas which was obtained by the analysis, and the production rate of the hydrogen-containing gas are shown in Table 1 below. Moreover, a change in the hydrogen production rate, which follows an elapse of a reforming time in this comparative example, is shown in the graph of FIG. 11.

COMPARATIVE EXAMPLE 2

Figure 10:
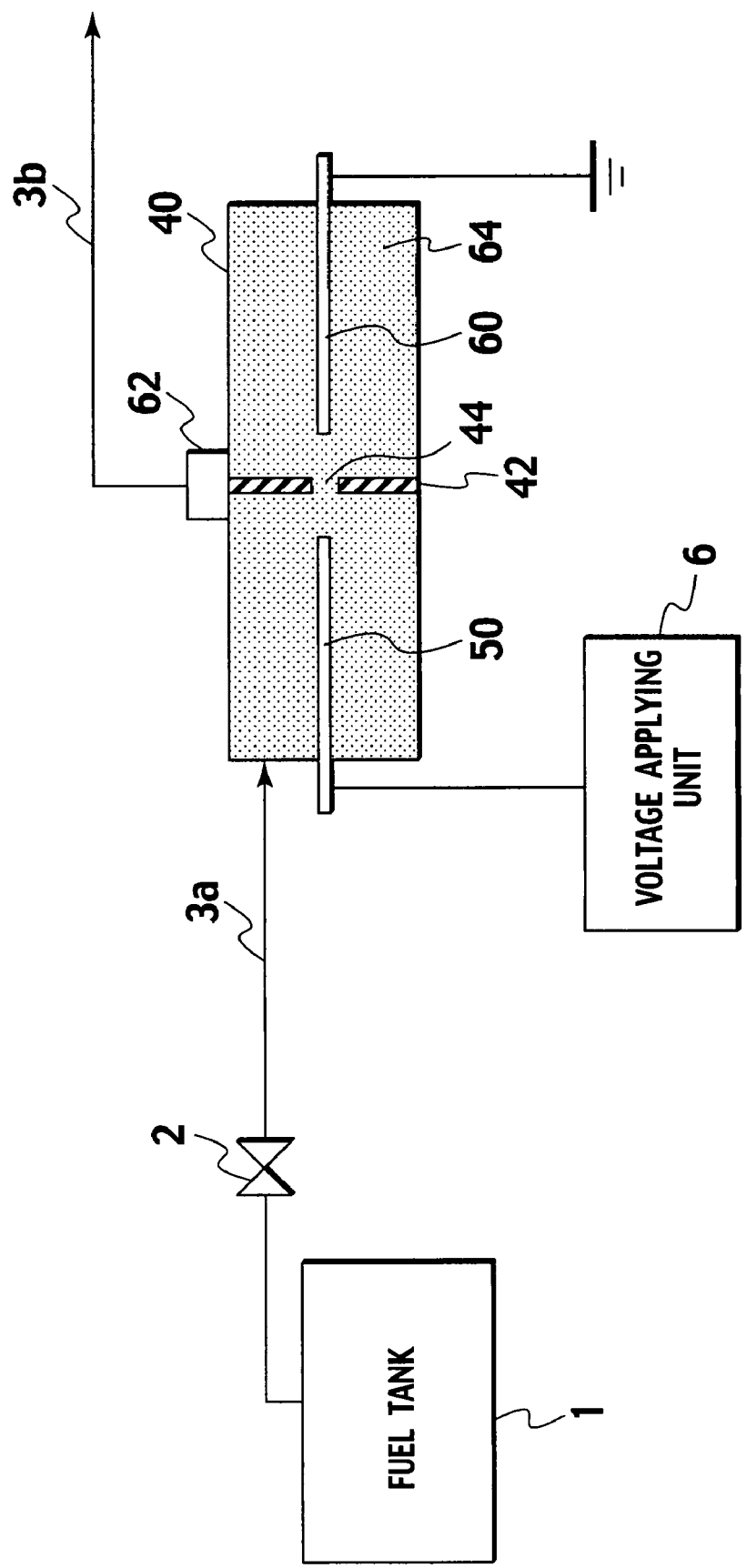
FIG. 10 is a schematic view showing a fuel reformer of Comparative Example 2.

The iso-octane was reformed in the liquid phase by using a fuel reformer of a mode shown in FIG. 10, and the hydrogen-containing gas was produced.

The fuel reformer shown in FIG. 10 is different from the fuel reformer of the mode shown in FIG. 7 in that the surface of the electrode 50 connected to the voltage applying unit 6 is not coated with the insulating material, and that an insulating film 42 is installed on the center portion of the reaction container 40. This insulating film 42 is made of polytetrafluoroethylene (PTFE) as an insulating material, in which a diameter is 500 mm and a thickness is 1 mm in size. Moreover, a pinhole 44 with a diameter of 1 mm is provided in a center portion of this insulating film 42. Note that the pair of electrodes (50, 60) are installed so that a straight line connecting these electrodes to each other can pass through the center of the pinhole 44, and a crossing angle of the above-described straight line and the insulating film 42 is 90°.

By using this fuel reformer, the reforming was performed by similar conditions to those of Example 1 described above, the hydrogen-containing gas was produced, and a component composition of the gas concerned was analyzed. Moreover, a production rate of the hydrogen-containing gas was determined. The component composition of the hydrogen-containing gas which was obtained by the analysis, and the production rate of the hydrogen-containing gas are shown in Table 1 below. Moreover, a change in the hydrogen production rate, which follows an elapse of a reforming time in this comparative example, is shown in the graph of FIG. 11. In FIG. 11, the abscissa represents the reforming time in minutes, and the ordinate represents the hydrogen production rate in mmol/min.

TABLE 1

| | Component composition in hydrogen-containing gas (volume %) | | | | | | | Gas production rate (mmol/ |
| --- | --- | --- | --- | --- | --- | --- | --- | --- |
| | $H_2$ | $CH_4$ | $C_2H_4$ | $C_2H_6$ | $C_2H_2$ | $C_3H_6$ | $C_4H_8$ | min.) |
| Example 1 | 60 | 9 | 3 | 1 | 24 | 2 | 1 | 0.6 |
| Example 2 | 60 | 9 | 3 | 1 | 24 | 2 | 1 | 1.8 |

TABLE 1-continued

|  | Component composition in hydrogen-containing gas (volume %) | | | | | | | Gas production rate (mmol/min.) |
| --- | --- | --- | --- | --- | --- | --- | --- | --- |
|  | $H_2$ | $CH_4$ | $C_2H_4$ | $C_2H_6$ | $C_2H_2$ | $C_3H_6$ | $C_4H_8$ | |
| Comparative Example 1 | 59 | 6 | 2 | 1 | 27 | 3 | 2 | 0.4 |
| Comparative Example 2 | 60 | 8 | 3 | 1 | 25 | 2 | 1 | 0.6 |

The results in Table 1 show that, by using the fuel reformer of Example 1, the hydrogen-containing gas having a substantially similar composition to those in the fuel reformer (Comparative Example 1) for reforming the fuel in a vapor phase and the fuel reformer (Comparative Example 2) for reforming the fuel by installing the insulating film 42 in the reaction container 40 can be obtained at a substantially similar production rate. Note that, in the fuel reformer 4 of Example 2, in which the three pairs of electrodes are installed, the hydrogen-containing gas is produced at an approximately triple gas production rate of that of the apparatus of Example 1 to show that the installation of the plural pairs of electrodes is effective.

Moreover, from the results shown in FIG. 11, it is understood that, in the reforming by the fuel reformer of Comparative Example 1, it takes time to start the production of hydrogen, and the reforming in Comparative Example 1 is inferior in startability. This is thought to be because it is necessary to vaporize the iso-octane by the vaporizer 67. In addition, in Comparative Example 1, the hydrogen production rate decreased after an elapse of a certain time, and finally, became zero. This is thought to be because carbon is deposited on the surfaces of the electrodes since the reforming is performed in the vapor phase, and the electrodes are finally short-circuited.

Meanwhile, in the reforming by the fuel reformer of Comparative Example 2, though the startability is good, the hydrogen production rate decreased after an elapse of a certain time. This is thought to be because bubbles of the produced gas are attached onto the pinhole 44 provided in the insulating film 42, and the electric discharge becomes unstable.

As opposed to this, in the fuel reformers of Examples 1 and 2, there is no apprehension that the variety of problems described above are caused. Therefore, the fuel reformers of Examples 1 and 2 are excellent in startability, and sustain the reforming for a long time.

Note that not only the apparatuses of Examples 1 and 2 but also the apparatus of Comparative Example 2 can be used as the fuel reformer of the fuel reforming system of the present invention. Specifically, as the fuel reformer of the fuel reforming system of the present invention, any device can be used as long as the device generates the reformed gas by the plasma reforming without vaporizing the liquid fuel.

Next, a description is made in detail of the catalyst reactor in the fuel supply system of the present invention.

(Catalyst Reactor)

The catalyst reactor 12 in the fuel supply system of the present invention is a device for converting the raw fuel into the reformed fuel by utilizing the exhaust heat of the engine and the reforming catalyst.

As the reforming catalyst, a catalyst for reforming the hydrocarbon to the hydrogen-containing gas can be used. As the catalyst usable for reforming the hydrocarbon to the hydrogen-containing gas, a catalyst can be used, in which noble metal such as platinum and rhodium or transition metal such as nickel, iron and cobalt are supported on a support made of a porous heat-resistant inorganic material such as alumina, titania, zirconia and ceria. A steam reforming reaction is accelerated by using the reforming catalyst as described above, and the hydrocarbon is thereby reformed to the hydrogen-containing gas. Then, the above-described reforming catalyst is carried in the inside of the catalyst reactor.

Figure 12:
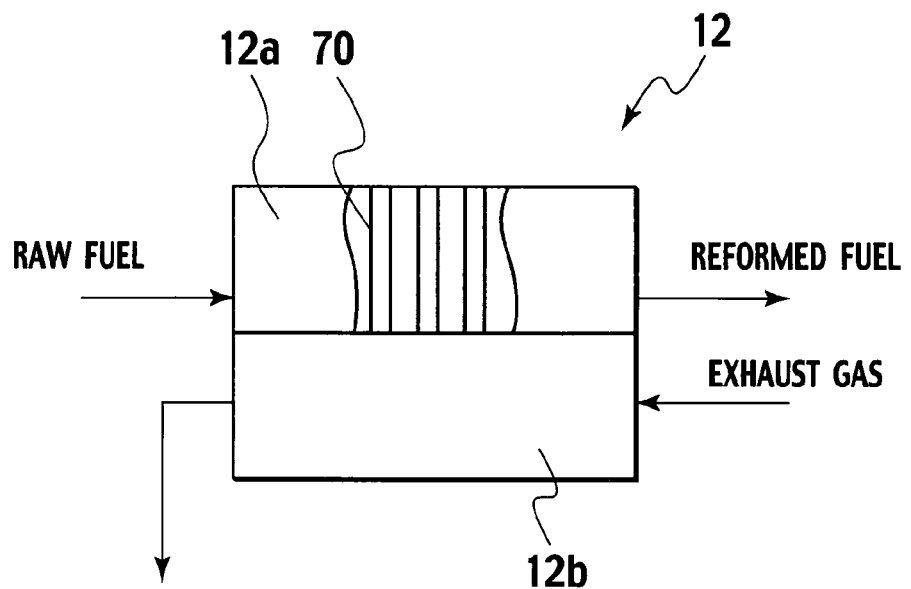
FIG. 12 is a schematic view showing a catalyst reactor of the present invention.

As the catalyst reactor for use in the system of the present invention, there is the one shown in FIG. 12. FIG. 12 shows a schema of the catalyst reactor suitably used for the present invention. FIG. 12 partially omits an external wall of the catalyst reactor, and shows the catalyst reactor so that an inner structure thereof can be seen.

Figure 13:
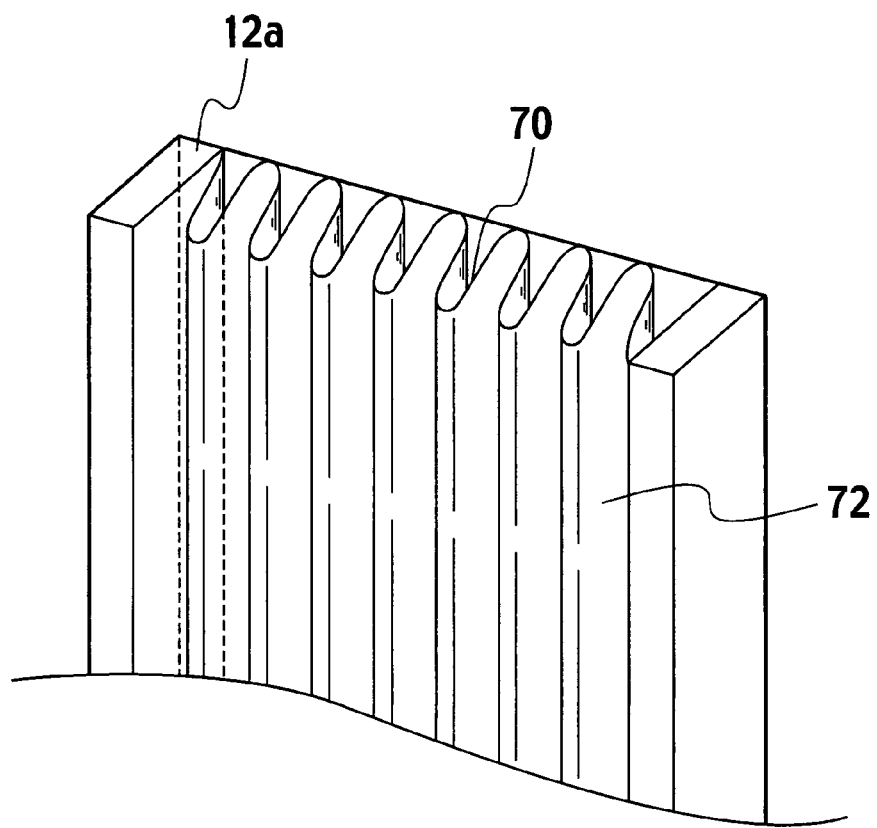
FIG. 13 is a perspective view showing an example of plate fins in the catalyst reactor of the present invention.

The catalyst reactor 12 of the present invention includes a plate fin-type heat exchanger (heating unit), and specifically, is composed of the low-temperature portion 12a in which the reforming catalyst is carried, and of the high-temperature portion 12b through which the exhaust gas from the engine passes. In the inside of the low-temperature portion 12a, as shown in FIG. 13, plate fins 70 are provided, and further, a porous carrier 72 on which the above-described noble metal and transition metal are carried is provided on surfaces of the plate fins 70. Moreover, the high-temperature portion 12b is provided on a side surface of the low-temperature portion 12a. This catalyst reactor 12 is a device for transmitting, to the low-temperature portion 12a, heat of the exhaust gas passing through the high-temperature portion 12b by using the plate fin-type heat exchanger, heating up the reforming catalyst and the raw fuel by the heat, and accelerating the reforming reaction.

A description is made of a function of this catalyst reactor 12. As shown in FIG. 12, first, the raw fuel is supplied from the fuel tank 1 to the low-temperature portion 12a of the catalyst reactor 12. The supplied raw fuel is heated up by the heat from the plate fins 70 of the low-temperature portion 12a. Then, the heated raw fuel causes the reforming reaction by contacting the reforming catalyst heated up in a similar way, and is converted into the hydrogen-containing gas. Thereafter, the mixture of the hydrogen-containing gas and the raw fuel is fed to the fuel supply device 8.

As described above, the catalyst reactor 12 of the present invention is capable of continuously producing the hydrogen-containing gas if the raw fuel such as the hydrocarbon is introduced into the reforming catalyst. Then, the produced hydrogen-containing gas is introduced into the engine together with the raw fuel, thus making it possible to realize an efficient combustion state. Moreover, the noble metal and the transition metal in the above-described reforming catalyst are supported on the porous support 72, and accordingly, a decrease of catalyst performance can be restricted to a large extent. Therefore, it is not necessary to replace the above-described catalyst for a long period of time, and accordingly to realize a reduction of a maintenance time and a reduction of replacement cost.

The entire contents of Japanese Patent Application No. 2004-219466 (filed on Jul. 28, 2004) and Japanese Patent Application No. 2005-044289 (filed on Feb. 21, 2005) are incorporated herein by reference.

The description has been made above of the contents of the present invention along the embodiments and the examples; however, it is obvious to those skilled in the art that the present invention is not limited to the descriptions of these, and that various modifications and improvements are possible.

INDUSTRIAL APPLICABILITY

The fuel supply system of the present invention uses the fuel reformer for producing the hydrogen-containing gas by causing the discharge in the fuel liquid without vaporizing the fuel supplied from the fuel tank. Therefore, the fuel supply system can produce hydrogen immediately after the start of the engine without bringing the enlargement of the system. Moreover, the fuel supply system can improve the combustibility of the fuel by supplying the gas fuel to the engine together with the liquid fuel.

The invention claimed is:

1. A fuel supply system, comprising:
    a fuel reformer configured to produce a reformed gas-containing fuel by causing discharge in a liquid fuel;
    a fuel supply device configured to supply the reformed gas-containing fuel or a mixture of the reformed gas-containing fuel and the liquid fuel into a combustion chamber of an engine; and
    an electric discharge controller configured to control a discharge voltage of the fuel reformer in response to an output state of the engine,
    wherein the fuel reformer comprises:
        a reaction container filled with the liquid fuel;
        a first electrode which is electrically connected to the electric discharge controller, and is in the reaction container;
        a second electrode which is in the reaction container to be opposed to the first electrode, and is configured to generate plasma by an electric discharge with the first electrode in the liquid-fuel-filled reaction container; and
        an emission unit configured to emit reformed gas, wherein the reformed gas is produced by contact of the liquid fuel with the plasma, from the reaction container,
    wherein a surface of the first electrode, which is a surface located in an interior of the reaction container, includes a coated portion coated with an insulating material, and an exposed portion which is not coated with the insulating material.

2. The fuel supply system according to claim 1, further comprising:
    a fuel tank,
    wherein the fuel reformer is provided in the fuel tank.

3. The fuel supply system according to claim 1, further comprising:
    a fuel tank which stores the liquid fuel;
    a first fuel supply passage which is provided with the fuel reformer, wherein the first fuel supply passage is configured to supply the liquid fuel from the fuel tank to the fuel reformer, and to further supply the reformed gas-containing fuel from the fuel reformer to the fuel supply device,
    a second fuel supply passage configured to directly supply the liquid fuel from the fuel tank to the fuel supply device; and
    a supply controller configured to change a supply quantity of the reformed gas-containing fuel from the first fuel supply passage and a supply quantity of the liquid fuel from the second fuel supply passage in response to an output state of the engine.

4. The fuel supply system according to claim 1, further comprising:
    a fuel tank which stores the liquid fuel;
    a first fuel supply passage which is provided with the fuel reformer, wherein the first fuel supply passage is configured to supply the liquid fuel from the fuel tank to the fuel reformer, and further supply the reformed gas-containing fuel from the fuel reformer to the fuel supply device;
    a third fuel supply passage which is provided with a catalyst reactor for producing a reformed fuel by reforming the liquid fuel by using exhaust heat from the engine, wherein the third fuel supply passage is configured to supply the liquid fuel from the fuel tank to the catalyst reactor, and to further supply the reformed fuel from the catalyst reactor to the fuel supply device; and
    a selection controller configured to change a supply quantity of the reformed gas-containing fuel from the first fuel supply passage and a supply quantity of the reformed fuel from the third fuel supply passage in response to an output state of the engine.

5. The fuel supply system according to claim 4, wherein the selection controller is configured to change the supply quantity of the reformed gas-containing fuel and the supply quantity of the reformed fuel based on a temperature of exhaust gas from the engine.

6. The fuel supply system according to claim 1, further comprising:
    a reformed fuel storage unit which is provided between the fuel reformer and the fuel supply device, and is configured to store the reformed gas-containing fuel.

7. The fuel supply system according to claim 1, wherein a ratio of an area of the exposed portion with respect to a total area of the coated portion and the exposed portion is 1 to 20%.

8. The fuel supply system according to claim 1, wherein the exposed portion is present only on a surface of the first electrode, the surface being opposite to the second electrode.

9. The fuel supply system according to claim 7, wherein the area of the exposed portion is 0.5 to 10 $mm^2$.

10. The fuel supply system according to claim 1, wherein the electric discharge is a pulse discharge with the number of pulses of 5 to 500 times/sec.

11. The fuel supply system according to claim 4, wherein the catalyst reactor includes a reforming catalyst, and
    the reforming catalyst is formed by immobilizing noble metal or transition metal on a porous material.

12. The fuel supply system according to claim 11, wherein the catalyst reactor is composed of a high-temperature portion through which exhaust gas passes, and of a low-temperature portion in which the reforming catalyst is provided.

13. The fuel supply system according to claim 12, wherein the catalyst reactor includes a heating unit.

14. The fuel supply system according to claim 13, wherein the heating unit includes a plate fin-type heat exchanger.

15. The fuel supply system according to claim 1, wherein the liquid fuel is hydrocarbon, and the reformed gas-containing fuel is hydrogen-containing gas.

16. The fuel supply system according to claim 1, wherein the liquid fuel is a mixture of alcohol and water, and the reformed gas-containing fuel is hydrogen-containing gas.

17. The fuel supply system according to claim 1, wherein the reaction container filled with the liquid fuel contains only the liquid fuel.

18. The fuel supply system according to claim 1, wherein the liquid fuel consists of one or more hydrocarbons or mixtures thereof with water.

19. The fuel supply system according to claim 1, wherein the first and second electrodes are immersed in the liquid fuel.

20. The fuel supply system according to claim 19, wherein the liquid fuel consists of one or more hydrocarbons or mixtures thereof with water.

* * * * *